Feb. 1, 1927. 1,616,294
E. YOST ET AL
AUTOMOBILE TOP AND CURTAIN STRUCTURE
Filed Feb 3. 1925 2 Sheets-Sheet 1
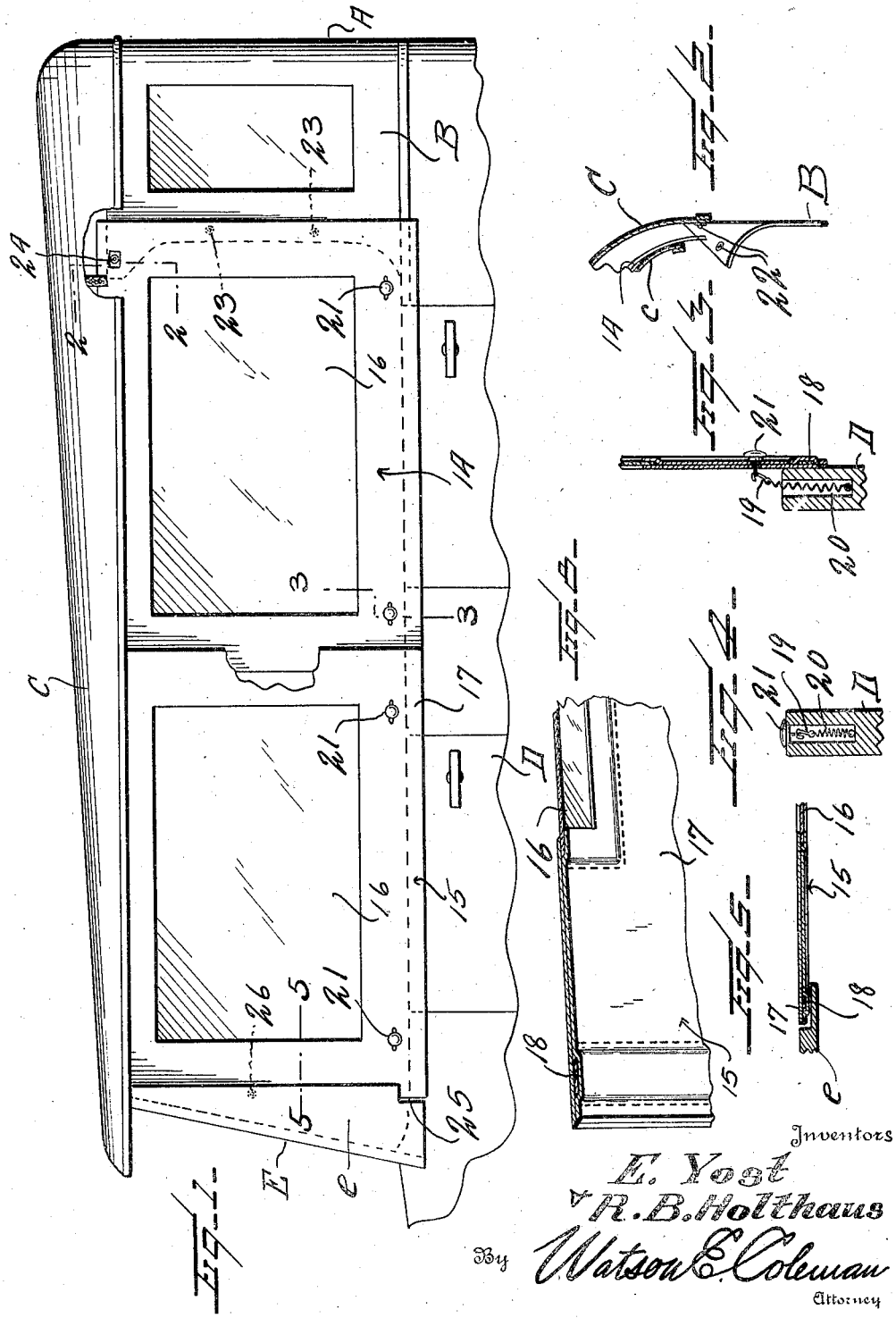

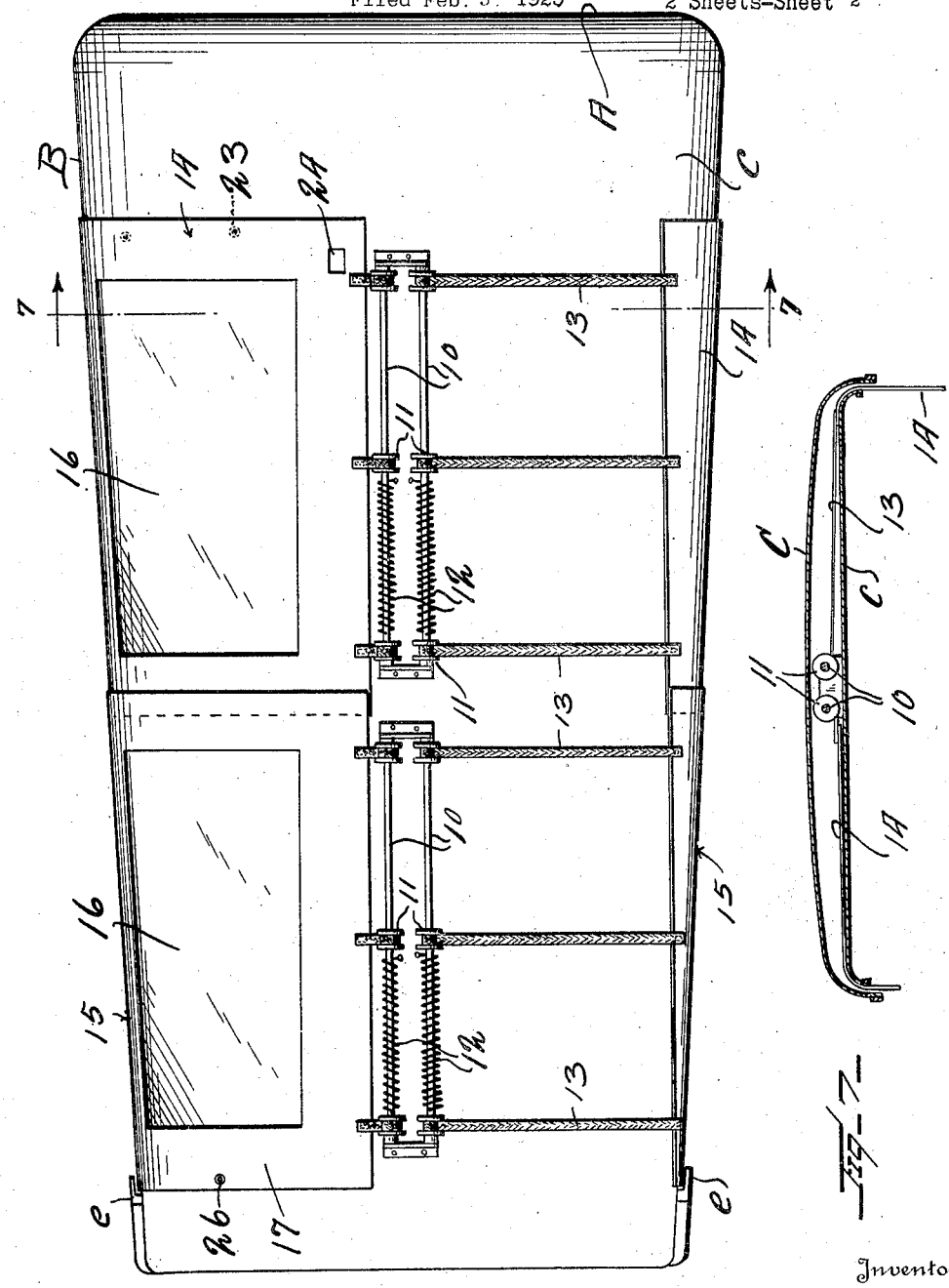

Patented Feb. 1, 1927.

1,616,294

UNITED STATES PATENT OFFICE.

ERNEST YOST AND RAINSFORD B. HOLTHAUS, OF CHADRON, NEBRASKA.

AUTOMOBILE TOP AND CURTAIN STRUCTURE.

Application filed February 3, 1925. Serial No. 6,594.

This invention relates to automobile tops and curtains, and particularly to automobiles in which the curtains are so mounted as to slide from their curtaining position to a concealed position.

The general object of the invention is to provide an automobile having a top with curtains so mounted that they will slide into the space between the outer shell of the top and the inside finish or sealing cloth of the top.

A further object is to provide a spring-actuated reeling device disposed within the top and which is engaged with the curtains so that when the curtains are released from their engagement with the body the curtains will be shifted automatically into the space above referred to and will be entirely concealed and out of the way.

A still further object is to provide means whereby the rear curtain will be caused to overlap the quarterback of the car and the front curtain will be caused to overlap the forward edge of the rear curtain and the windshield will be caused to overlap the forward edge of the front curtain, the windshield being so formed as to permit the front curtain to be drawn down over the side wall of the body of the car.

Other objects will appear in the course of the following description.

Our invention is illustrated in the accompanying drawings, wherein:—

Figure 1 is a side elevation of a motor car having a top and curtains constructed in accordance with our invention;

Figure 2 is a fragmentary section on the line 2—2 of Figure 1 but showing the quarterback in position to permit the descent of the curtain;

Figure 3 is a section on the line 3—3 of Figure 1;

Figure 4 is a like view to Figure 3 but showing the manner in which the hook-receiving recess is closed;

Figure 5 is a section on the line 5—5 of Figure 1;

Figure 6 is an under side plan view looking upward against the top of the car;

Figure 7 is a section on the line 7—7 of Figure 6;

Figure 8 is a fragmentary section of one of the curtains.

Referring to these drawings, it will be seen that we have illustrated conventionally a motor car having a permanent top, that is a top which is not foldable back, this motor car having, of course, a rear wall A and what is known as a quarterback B, the outer shell C of the top extending over this quarterback wall. The side walls D of the car are provided with any suitable doors, as is usual. The top of the car, as illustrated, is composed of an outer shell C and an inner finishing member $c$ which may be made of cloth or any other suitable material and which lies parallel with the outer shell C and which will hereafter be termed the inner shell. This inner shell $c$ is spaced from the outer shell C and the outer shell and the inner shell extend downward at the sides a short distance.

Disposed between the outer and inner shells and extending longitudinally thereof are supporting shafts 10, and carried upon these supporting shafts 10 are spools 11 shown as three in number. There are a pair of these supporting shafts at the rear of the car and a pair at the forward portion of the car, and one of the shafts of each pair is for the forward or rear curtain on the left hand side, while the other shafts are for the forward and rear curtains on the right hand side. Mounted upon these shafts are spools 11, as before stated, there being preferably three spools on each shaft, though a greater or less number of spools may be used. These shafts are spring-retracted, that is there is a spring 12 which tends to turn the corresponding shaft in a direction to wind up the belts 13 which at one end are attached to these spools and at the other end attached to the side curtains of the machine.

We have illustrated four of these side curtains, the rear curtains being designated 14 and the front curtains designated generally 15. The front and rear curtains are both formed with panes 16 of celluloid or like flexible but transparent material. Each side curtain includes a frame 17 surrounding the pane and within which the pane is mounted, this frame being formed preferably of two thicknesses of flexible leather. Within the frame are stiffening members of flat spring steel, designated 18 in Figure 5, and which act to make the curtain stiff and firm but which will bend as the curtains pass from a vertical to a horizontal position.

It will be noted that the front curtain 15 has its rear edge overlapping the forward edge of the rear curtain 14 on each side of the machine and that the rear curtain 14 at its rear edge or margin overlaps the quarterback B, while the sides *e* of the windshield E overlap the forward edges of the front curtains. As before remarked, the straps or bands 13 are attached at their ends to the upper edges of the front and rear curtains 14 and 15 and when these curtains are released the springs 12, acting upon the spools 11, wind up these bands 13 and thereby draw the forward and rear curtains up into the space between the inner shell and the outer shell of the top. When the curtains are drawn downward into their lowered position, they may be held in this lowered position by any suitable means as, for instance, buttons and preferably by hooks 19 which are disposed in sockets in the top of each wall, this hook being retracted by a spring 20 and having a button cap 21 at its top which will cover the opening of the socket in the wall. This hook may be pulled out and engaged with the curtain when the curtain is drawn downward, and when the curtain is released and is concealed this hook will be entirely concealed by the cap 21.

As shown in Figure 2, the upper margin of the quarterback B extends beneath the outer shell of the top but at its forward edge this upper margin is not permanently engaged with the top but is fastened to the outer shell of the top by any suitable means as, for instance, a snap fastener 22. The curtain 14 has its rear margin extending beyond the forward margin of the quarterback so that it is necessary to have the upper corner of the quarterback separated from the outer shell of the top in order to permit the curtain 14 to move downward with its rear margin overlapping the forward margin of the quarterback, as illustrated in Figure 1. Preferably the quarterback is provided with snap fastening members 23 and the rear margin of the curtain is also provided with snap fastening members which will engage these snap fastening members 23 so as to attach the curtain to the forward margin of the quarterback. When the curtain 14 is raised it disappears within the outer shell and then the quarterback, which has its upper margin disposed within the outer shell, is attached at its upper corner to the outer shell by the snap fastening members 22, as previously stated. The rear margin of the forward curtain 15 also overlaps the front margin of the rear curtain 14 and the resilient strips 18 act to hold the overlapped portion of the forward curtain against the underlapped portion of the rear curtain so as to make a relatively tight joint. Of course, it is obvious that snap fasteners may be used to hold these overlapping margins together. Other fastening devices may also be used. Preferably each rear curtain 14 will be provided with a small eyelet 24 at or near the top upper corner so that when the curtain is down in place this eyelet will register with the snap fastening members 22 and thus the quarterback can be again fastened to the outer shell of the top.

We have illustrated a windshield E having rounded end portions *e* which may be made of flexible leather or of relatively stiff material if desired, the lower rear corner of each of these end portions *e* being cut away, as at 25. The forward margin of each front curtain comes down over and is overlapped by the rear margin of this portion *e* and the curtain itself will extend down through this cut-away portion 25. Preferably the forward edges of each front curtain will be provided with snap fastening members 26 which will engage with coacting snap fastening members upon the windshield wings or ends *e* which will thus hold the front curtains in place.

Thus it will be seen that a tight connection is made between the forward edges of the front curtains and the windshield which will absolutely prevent the entrance of rain or snow and form a tight, water-proof joint between the curtains and the windshield.

While we have illustrated certain details which are believed to be particularly effective, we do not wish to be limited to these details as it is obvious that many minor changes might be made therein without departing from the spirit of the invention.

We claim:—

1. The combination with a vehicle having side walls, a quarterback, and a top, the lateral margins of the top extending downward toward the side walls, of forward and rear pairs of curtains adapted to bridge the gap between the top and the side walls, means acting to retract the curtains into a position beneath the top, means for fastening the curtains to the side walls of the body and said quarterback and holding the margins of the curtains in engagement with each other, the rearmost curtains extending inward of and rearward with relation to the forward edge of the quarterback and the quarterback having its upper corner at its forward margin detached from the top to permit the passage of the rear margin of the rear curtain, and means on the inside of the top and on the exterior of the upper forward corner of the quarterback for engaging this corner of the quarterback with the top when the side curtains are not in use.

2. The combination with a vehicle having side walls, a top, a quarterback and a windshield, the windshield having wings at its extremities extending rearward, of forward and rear pairs of curtains adapted to bridge the gap between the top and the side walls, means for causing the retraction of said curtains to a position within the top, the forward curtains overlapping the forward edges of the rear curtains, and the rearmost curtains having their rear edges overlapping the forward edges of the quarterbacks, the foremost curtains having their forward edges underlapping the rear margins of the windshield wings, the lower rear corners of the windshield wings being cut away to permit the forward corners of the forward curtains to pass therethrough, and means for holding the curtains in operative position and fastening said curtains detachably to the quarterbacks, the windshield wings, and to each other.

In testimony whereof we hereunto affix our signatures.

ERNEST YOST.
    RAINSFORD B. HOLTHAUS.